(12) United States Patent
Soskind et al.

(10) Patent No.: US 12,111,421 B2
(45) Date of Patent: Oct. 8, 2024

(54) WAVEGUIDE-BASED TRANSMITTERS WITH ADJUSTABLE LIGHTING

(71) Applicant: APPLE INC., Cupertino, CA (US)

(72) Inventors: Yakov G. Soskind, Plainsboro, NJ (US); Alexander Shpunt, Saratoga, CA (US); Graham C. Townsend, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 484 days.

(21) Appl. No.: 17/549,914

(22) Filed: Dec. 14, 2021

(65) Prior Publication Data

US 2022/0299605 A1 Sep. 22, 2022

Related U.S. Application Data

(60) Provisional application No. 63/162,043, filed on Mar. 17, 2021.

(51) Int. Cl.
*G01S 7/484* (2006.01)
*G01B 11/22* (2006.01)
*G01S 17/89* (2020.01)
*G02F 1/21* (2006.01)

(52) U.S. Cl.
CPC .............. *G01S 7/484* (2013.01); *G01B 11/22* (2013.01); *G01S 17/89* (2013.01); *G02F 1/216* (2013.01)

(58) Field of Classification Search
CPC ......... G01S 7/484; G01S 17/89; G01B 11/22; G02F 1/216
USPC ....................................................... 359/259
See application file for complete search history.

(56) References Cited

U.S. PATENT DOCUMENTS

| 3,796,498 | A | 3/1974 | Post |
| 4,386,827 | A | 6/1983 | Scifres et al. |
| 4,850,673 | A | 7/1989 | Velzel et al. |
| 4,983,825 | A | 1/1991 | Ichikawa et al. |

(Continued)

FOREIGN PATENT DOCUMENTS

| CN | 1725042 A | 1/2006 |
| EP | 0670510 A2 | 9/1995 |

(Continued)

OTHER PUBLICATIONS

Fienup, J.R., "Phase Retrieval Algorithms: A Comparison", Applied Optics, vol. 21, No. 15, pp. 2758-2769, Aug. 1, 1982.

(Continued)

*Primary Examiner* — William Choi
(74) *Attorney, Agent, or Firm* — MEITAR PATENTS LTD.

(57) ABSTRACT

An optical transmission device includes a waveguide including a transparent medium having mutually-parallel first and second surfaces arranged so that light propagates within the waveguide by internal reflection between the first and second surfaces. At least one light source is configured to inject coherent light into the waveguide. A first array of diffractive structures is applied to the waveguide and configured to couple respective beams of the coherent light out through the first surface of the waveguide. The device includes a second array of tunable optical phase modulators, which are overlaid on respective ones of the diffractive structures in the first array and are configured to apply different respective phase shifts to the respective beams, thereby modulating a far-field light pattern formed by interference between the beams.

20 Claims, 7 Drawing Sheets

(56) References Cited

U.S. PATENT DOCUMENTS

| | | | |
|---|---|---|---|
| 5,067,816 | A | 11/1991 | Ichikawa |
| 5,225,928 | A | 7/1993 | Dugan |
| 5,406,543 | A | 4/1995 | Kobayashi et al. |
| 5,428,445 | A | 6/1995 | Holzapfel |
| 5,477,383 | A | 12/1995 | Jain |
| 5,606,181 | A | 2/1997 | Sakuma et al. |
| 5,621,497 | A | 4/1997 | Terasawa et al. |
| 5,648,951 | A | 7/1997 | Kato et al. |
| 5,652,426 | A | 7/1997 | Maeda |
| 5,691,989 | A | 11/1997 | Rakuljic et al. |
| 5,703,675 | A | 12/1997 | Hirukawa et al. |
| 5,742,262 | A | 4/1998 | Tabata et al. |
| 5,781,332 | A | 7/1998 | Ogata |
| 5,801,378 | A | 9/1998 | Hane et al. |
| 5,812,320 | A | 9/1998 | Maeda |
| 6,002,520 | A | 12/1999 | Hoch et al. |
| 6,031,611 | A | 2/2000 | Rosakis et al. |
| 6,236,773 | B1 | 5/2001 | Butler et al. |
| 6,415,083 | B1 | 7/2002 | Anderson et al. |
| 6,560,019 | B2 | 5/2003 | Nakai |
| 6,583,873 | B1 | 6/2003 | Goncharov et al. |
| 6,611,000 | B2 | 8/2003 | Tamura et al. |
| 6,707,027 | B2 | 3/2004 | Liess et al. |
| 6,927,852 | B2 | 8/2005 | Reel |
| 6,940,583 | B2 | 9/2005 | Butt et al. |
| 7,112,774 | B2 | 9/2006 | Baer |
| 7,112,813 | B2 | 9/2006 | Den Boef et al. |
| 7,123,794 | B2 | 10/2006 | Greiner et al. |
| 7,227,618 | B1 | 6/2007 | Bi |
| 7,304,735 | B2 | 12/2007 | Wang et al. |
| 7,335,898 | B2 | 2/2008 | Donders et al. |
| 7,433,444 | B2 | 10/2008 | Baumann et al. |
| 7,470,892 | B2 | 12/2008 | Ohmura et al. |
| 7,492,871 | B2 | 2/2009 | Popescu et al. |
| 7,522,698 | B2 | 4/2009 | Popescu et al. |
| 7,564,941 | B2 | 7/2009 | Baumann et al. |
| 7,700,904 | B2 | 4/2010 | Toyoda et al. |
| 7,952,781 | B2 | 5/2011 | Weiss et al. |
| 8,530,811 | B2 | 9/2013 | Molnar et al. |
| 8,749,796 | B2 | 6/2014 | Pesach et al. |
| 8,908,277 | B2 | 12/2014 | Pesach et al. |
| 9,036,158 | B2 | 5/2015 | Pesach |
| 9,066,087 | B2 | 6/2015 | Shpunt |
| 9,098,931 | B2 | 8/2015 | Shpunt et al. |
| 9,105,369 | B2 | 8/2015 | Koehler |
| 9,131,136 | B2 | 9/2015 | Shpunt et al. |
| 9,201,237 | B2 | 12/2015 | Chayat et al. |
| 9,222,899 | B2 | 12/2015 | Yamaguchi |
| 9,395,176 | B2 | 7/2016 | Saendig |
| 9,689,968 | B2 | 6/2017 | Zou et al. |
| 9,696,605 | B2 | 7/2017 | Russo et al. |
| 9,874,531 | B2 | 1/2018 | Yun et al. |
| 9,881,710 | B2 | 1/2018 | Roessl et al. |
| 10,634,973 | B2 | 4/2020 | Hashemi et al. |
| 10,802,120 | B1 | 10/2020 | LaChapelle et al. |
| 10,838,132 | B1 | 11/2020 | Calafiore et al. |
| 2004/0012958 | A1 | 1/2004 | Hashimoto et al. |
| 2004/0082112 | A1 | 4/2004 | Stephens |
| 2004/0184694 | A1 | 9/2004 | Ridgway et al. |
| 2005/0178950 | A1 | 8/2005 | Yoshida |
| 2006/0001055 | A1 | 1/2006 | Ueno et al. |
| 2006/0252167 | A1 | 11/2006 | Wang |
| 2006/0252169 | A1 | 11/2006 | Ashida |
| 2006/0269896 | A1 | 11/2006 | Liu et al. |
| 2007/0007676 | A1 | 1/2007 | Sato |
| 2007/0019909 | A1 | 1/2007 | Yamauchi et al. |
| 2007/0183560 | A1 | 8/2007 | Popescu et al. |
| 2008/0106746 | A1 | 5/2008 | Shpunt et al. |
| 2008/0198355 | A1 | 8/2008 | Domenicali et al. |
| 2008/0212835 | A1 | 9/2008 | Tavor |
| 2008/0240502 | A1 | 10/2008 | Freedman et al. |
| 2008/0278572 | A1 | 11/2008 | Gharib et al. |
| 2009/0011368 | A1 | 1/2009 | Ichihara et al. |
| 2009/0090937 | A1 | 4/2009 | Park |
| 2009/0096783 | A1 | 4/2009 | Shpunt et al. |
| 2009/0183125 | A1 | 7/2009 | Magal et al. |
| 2009/0185274 | A1 | 7/2009 | Shpunt |
| 2010/0007717 | A1 | 1/2010 | Spektor et al. |
| 2010/0008588 | A1 | 1/2010 | Feldkhun et al. |
| 2010/0013860 | A1 | 1/2010 | Mandella et al. |
| 2010/0142014 | A1 | 6/2010 | Rosen et al. |
| 2010/0278479 | A1 | 11/2010 | Bratkovski et al. |
| 2010/0284082 | A1 | 11/2010 | Shpunt et al. |
| 2011/0019258 | A1 | 1/2011 | Levola |
| 2011/0069389 | A1 | 3/2011 | Shpunt |
| 2011/0075259 | A1 | 3/2011 | Shpunt |
| 2011/0114857 | A1 | 5/2011 | Akerman et al. |
| 2011/0187878 | A1 | 8/2011 | Mor et al. |
| 2011/0188054 | A1 | 8/2011 | Petronius et al. |
| 2011/0295331 | A1 | 12/2011 | Wells et al. |
| 2015/0242056 | A1 | 8/2015 | Hoffman |
| 2016/0161427 | A1 | 6/2016 | Butler et al. |
| 2019/0324202 | A1 | 10/2019 | Colburn et al. |
| 2019/0391271 | A1 | 12/2019 | Goodwill |
| 2020/0033190 | A1 | 1/2020 | Popovich et al. |
| 2020/0124474 | A1 | 4/2020 | Brueck et al. |
| 2020/0290622 | A1 | 9/2020 | Fattal |

FOREIGN PATENT DOCUMENTS

| | | | |
|---|---|---|---|
| JP | 2011118178 | A | 6/2011 |
| KR | 102070349 | B1 | 1/2020 |
| WO | 2007/043036 | A1 | 4/2007 |
| WO | 2007/105205 | A2 | 9/2007 |
| WO | 2008/120217 | A2 | 10/2008 |
| WO | 2010/004542 | A1 | 1/2010 |
| WO | 2012020380 | A1 | 2/2012 |
| WO | 2019195174 | A1 | 10/2019 |
| WO | 2020002164 | A1 | 1/2020 |
| WO | 2020072034 | A1 | 4/2020 |

OTHER PUBLICATIONS

Garcia et al . . . , "Projection of Speckle Patterns for 3D Sensing", Journal of Physics, Conference series 139, pp. 1-7, year 2008.

Garcia et al., "Three-dimensional mapping and range measurement by means of projected speckle patterns", Applied Optics, vol. 47, No. 16, pp. 3032-3040, Jun. 1, 2008.

Gerchberg et al., "A Practical Algorithm for the Determination of the Phase from Image and Diffraction Plane Pictures," Journal Optik, vol. 35, No. 2, pp. 237-246, year 1972.

Sazbon et al., "Qualitative Real-Time Range Extraction for Preplanned Scene Partitioning Using Laser Beam Coding," Pattern Recognition Letters 26, pp. 1772-1781, year 2005.

Moharam et al. "Rigorous coupled-wave analysis of planar-grating diffraction", Journal of the Optical Society of America, vol. 71, No. 6, pp. 811-818, Jul. 1981.

Microvision Inc., "Micro-Electro-Mechanical System (MEMS) Scanning Mirror", p. 1, years 1996-2009.

Eisen et al., "Total internal reflection diffraction grating in conical mounting" , Optical Communications 261, pp. 13-18, year 2006.

O'Shea et al., "Diffractive Optics: Design, Fabrication and Test", SPIE Tutorial Texts in Optical Engineering, vol. TT62, pp. 66-72, SPIE Press, USA 2004.

Btendo, "Two Uni-axial Scanning Mirrors Vs One Bi-axial Scanning Mirror", Kfar Saba, Israel, pp. 1-4, Aug. 13, 2008.

Marcia et al., "Fast Disambiguation of Superimposed Images for Increased Field of View", IEEE International Conference on Image Processing, San Diego, USA, pp. 1-4, Oct. 12-15, 2008.

Bradley et al., "Synchronization and Rolling Shutter Compensation for Consumer Video Camera Arrays", IEEE International Workshop on Projector-Camera Systems—PROCAMS 2009, Miami Beach, Florida, pp. 1-8, year 2009.

Ezconn Czech A.S. "Site Presentation", pp. 1-32, Oct. 2009.

Luxtera Inc., "Luxtera Announces World's First 10GBit CMOS Photonics Platform", Carlsbad, USA, pp. 1-2, Mar. 28, 2005 (press release).

Soskind, "Field Guide to Diffractive Optics," SPIE Press, Bellingham, USA, pp. 51-55, year 2011.

(56) References Cited

OTHER PUBLICATIONS

Soskind, "Field Guide to Diffractive Optics," SPIE Press, Bellingham, USA, pp. 56-59, year 2011.
Soskind, U.S. Appl No. 16/428,999, filed Jun. 2, 2019.
Poulton et al., "8192-Element Optical Phased Array with 100° Steering Range and Flip-Chip CMOS," Conference on Lasers and Electro-Optics (CLEO), pp. 1-2, year 2020.
Chung et al., "A Monolithically Integrated Large-Scale Optical Phased Array in Silicon-on-Insulator CMOS", IEEE Journal of Solid-State Circuits, vol. 53, issue 1, pp. 275-296, Jan. 2018.
Miller et al., "Large-Scale Optical Phased Array Using a Low-Power Multi-Pass Silicon Photonic Platform," Optica, vol. 7, No. 1, pp. 3-6, Jan. 2020.
U.S. Appl. No. 16/428,999 Office Action dated Feb. 7, 2022.
Wikipedia, "Talbot Effect," pp. 1-5, last edited Jan. 15, 2022.
Soskind et al., U.S. Appl. No. 17/151,170 filed Jan. 17, 2021.
Niu et al., "Development Status of Optical Phased Array Beam Steering Technology," Proceedings of SPIE, vol. 11052, p. 110521P-1-110521P-7, year 2019.
Rudnick et al., "Sub-GHz Resolution Photonic Spectral Processor and Its System Applications," IEEE Journal of Lightwave Technology, vol. 35, No. 11, pp. 2218-2226, Jun. 2017.
International Application # PCT/US2021/062996 Search Report dated Mar. 25, 2022.
U.S. Appl. No. 17/151,170 Office Action dated Feb. 3, 2023.
U.S. Appl. No. 17/151,170 Office Action dated Mar. 14, 2023.

| Array Element | 1,1 | 1,2 | 1,3 | 1,4 | 2,1 | 2,2 | 2,3 | 2,4 | 3,1 | 3,2 | 3,3 | 3,4 | 4,1 | 4,2 | 4,3 | 4,4 |
|---|---|---|---|---|---|---|---|---|---|---|---|---|---|---|---|---|
| Relative Phases 1 | 0 | 0 | 0 | 0 | 0 | 0 | 0 | 0 | 0 | 0 | 0 | 0 | 0 | 0 | 0 | 0 |
| Relative Phases 2 | 0 | $\frac{\pi}{2}$ | $-\pi$ | $\frac{\pi}{2}$ | 0 | $\frac{\pi}{2}$ | $-\pi$ | $\frac{\pi}{2}$ | 0 | $\frac{\pi}{2}$ | $-\pi$ | $\frac{\pi}{2}$ | 0 | $\frac{\pi}{2}$ | $-\pi$ | $\frac{\pi}{2}$ |
| Relative Phases 3 | 0 | $\pi$ | 0 | $\pi$ | 0 | $\pi$ | 0 | $\pi$ | 0 | $\pi$ | 0 | $\pi$ | 0 | $\pi$ | 0 | $\pi$ |
| Relative Phases 4 | $\pi$ | $\frac{\pi}{2}$ | 0 | $\frac{\pi}{2}$ | $\pi$ | $\frac{\pi}{2}$ | 0 | $\frac{\pi}{2}$ | $\pi$ | $\frac{\pi}{2}$ | 0 | $\frac{\pi}{2}$ | $\pi$ | $\frac{\pi}{2}$ | 0 | $\frac{\pi}{2}$ |

FIG. 6A

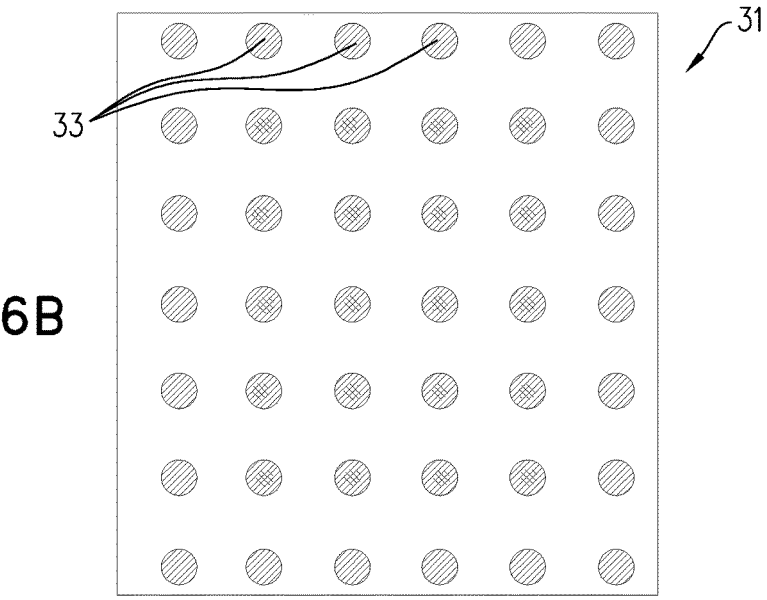

FIG. 6B

| Array Element | 1,1 | 1,2 | 1,3 | 1,4 | 2,1 | 2,2 | 2,3 | 2,4 | 3,1 | 3,2 | 3,3 | 3,4 | 4,1 | 4,2 | 4,3 | 4,4 |
|---|---|---|---|---|---|---|---|---|---|---|---|---|---|---|---|---|
| Fig. 7B | $\frac{\pi}{2}$ | $\frac{\pi}{2}$ | $\frac{\pi}{2}$ | $\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ |
| Fig. 7C | $-\pi$ | 0 | 0 | $-\pi$ | $-\pi$ | 0 | 0 | $-\pi$ | $-\pi$ | 0 | 0 | $-\pi$ | $-\pi$ | 0 | 0 | $-\pi$ |
| Fig. 7D | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ | $-\frac{\pi}{2}$ |

FIG. 7A

| Array Element | 1,1 | 1,2 | 1,3 | 1,4 | 2,1 | 2,2 | 2,3 | 2,4 | 3,1 | 3,2 | 3,3 | 3,4 | 4,1 | 4,2 | 4,3 | 4,4 |
|---|---|---|---|---|---|---|---|---|---|---|---|---|---|---|---|---|
| Fig. 8B | $\frac{\pi}{2}$ | $\frac{\pi}{2}$ | 0 | 0 | $\frac{\pi}{2}$ | 0 | 0 | $\frac{\pi}{2}$ | 0 | 0 | $\frac{\pi}{2}$ | $\frac{\pi}{2}$ | 0 | $\frac{\pi}{2}$ | $\frac{\pi}{2}$ | 0 |
| Fig. 8C | 0 | 0 | $-\frac{\pi}{2}$ | $\frac{\pi}{2}$ | $\frac{\pi}{2}$ | 0 | 0 | $-\frac{\pi}{2}$ | $-\frac{\pi}{2}$ | $-\frac{\pi}{2}$ | 0 | 0 | 0 | $-\frac{\pi}{2}$ | $-\frac{\pi}{2}$ | 0 |
FIG. 8A
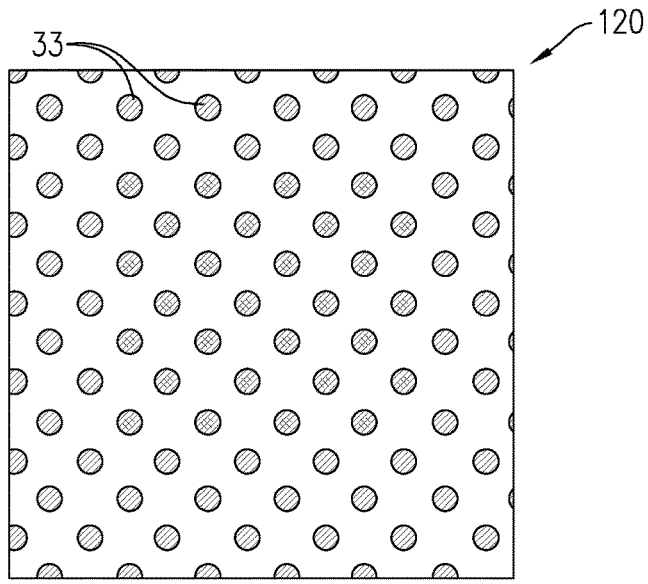
FIG. 8B
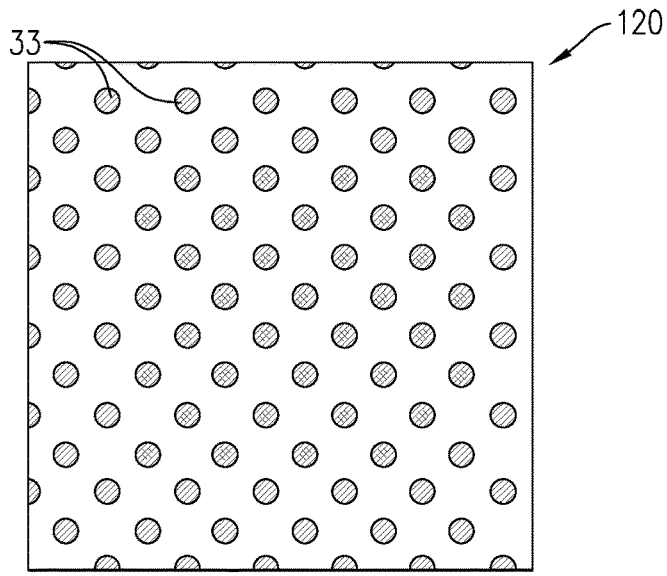
FIG. 8C

WAVEGUIDE-BASED TRANSMITTERS WITH ADJUSTABLE LIGHTING

CROSS-REFERENCE TO RELATED APPLICATION

This application claims the benefit of U.S. Provisional Patent Application 63/162,043, filed Mar. 17, 2021, which is incorporated herein by reference.

FIELD OF THE INVENTION

The present invention relates generally to optoelectronic devices, and particularly to devices and methods for projecting patterned light.

BACKGROUND

Various methods are known in the art for projecting patterned light with a variable, controllable pattern. For example, in an optical phased-array transmitter, output light from a laser source is split into several beams, each of which is then fed to a tunable phase shifter and then projected into free space. The projected beams combine in the far-field to form a pattern, which can be modified and steered by adjusting the relative phase shifts between the projected beams. The pattern may comprise a single spot of light or a more complex arrangement of multiple spots or other shapes.

The term "light," as used in the context of the present description and in the claims, is used interchangeably with the term "optical radiation" to refer to electromagnetic radiation in any of the visible, infrared, and ultraviolet spectral regions.

SUMMARY

Embodiments of the present invention that are described hereinbelow provide devices and methods for projection of patterned light.

There is therefore provided, in accordance with an embodiment of the invention, an optical transmission device, which includes a waveguide including a transparent medium having mutually-parallel first and second surfaces arranged so that light propagates within the waveguide by internal reflection between the first and second surfaces. At least one light source is configured to inject coherent light into the waveguide. A first array of diffractive structures is applied to the waveguide and configured to couple respective beams of the coherent light out through the first surface of the waveguide. The device includes a second array of tunable optical phase modulators, which are overlaid on respective ones of the diffractive structures in the first array and are configured to apply different respective phase shifts to the respective beams, thereby modulating a far-field light pattern formed by interference between the beams.

In some embodiments, the first and second arrays are two-dimensional arrays. In a disclosed embodiment, the waveguide includes a slab of the transparent medium, and the at least one light source is configured to inject multiple beams of the coherent light into the slab so that the beams propagate within the slab along respective beam paths that are aligned to impinge on different respective groups of the diffractive structures in the first array. Alternatively or additionally, the device includes a beam-splitting structure, which is configured to divide the coherent light injected by the at least one light source into multiple beams, which propagate within the slab along respective beam paths that are aligned to impinge on different respective groups of the diffractive structures in the first array. Further additionally or alternatively, the waveguide includes multiple beam-guiding channels between the first and second surfaces, and the diffractive structures are applied to the beam-guiding channels.

In a disclosed embodiment, the device includes a further diffractive structure applied to the waveguide to couple the coherent light from the at least one light source through one of the first and second surfaces into the waveguide.

Additionally or alternatively, the diffractive structures include surface-relief phase structures having dimensions smaller than a wavelength of the coherent light.

In some embodiments, the tunable optical phase modulators include electro-optical modulators, which may include liquid crystal cells.

In a disclosed embodiment, the second array extends over an area of the first surface of the transparent medium, and the tunable optical phase modulators cover a part of the area with a fill factor that is less than 20%.

In some embodiments, the device includes a controller coupled to apply control signals to the optical phase modulators to tune the respective phase shifts applied by the optical phase modulators to the respective beams. In one embodiment, the far-field light pattern includes a third array of spots, and the controller is configured to tune the respective phase shifts to shift the spots. Alternatively or additionally, the controller is configured to tune the respective phase shifts to change a number of the spots in the third array. Further additionally or alternatively, the controller is configured to tune the respective phase shifts to change respective intensities of the spots.

There is also provided, in accordance with an embodiment of the invention, a method for optical transmission, which includes providing a waveguide including a transparent medium having mutually-parallel first and second surfaces arranged so that light propagates within the waveguide by internal reflection between the first and second surfaces. Coherent light is injected into the waveguide. A first array of diffractive structures is applied to the waveguide to couple respective beams of the coherent light out through the first surface of the waveguide. A second array of tunable optical phase modulators, which are overlaid on respective ones of the diffractive structures in the first array, apply different respective phase shifts to the respective beams, thereby modulating a far-field light pattern formed by interference between the beams.

The present invention will be more fully understood from the following detailed description of the embodiments thereof, taken together with the drawings in which:

BRIEF DESCRIPTION OF THE DRAWINGS

FIG. 6A is a table listing patterns of phase shifts applied by an array of phase modulators, in accordance with an embodiment of the invention;

FIG. 6B is a schematic frontal view of a far-field light pattern projected by the device of FIG. 5A subject to one of the patterns of phase shifts listed in FIG. 6A, in accordance with an embodiment of the invention;

FIG. 7A is a table listing patterns of phase shifts applied by an array of phase modulators, in accordance with another embodiment of the invention;

FIG. 8A is a table listing patterns of phase shifts applied by an array of phase modulators, in accordance with yet another embodiment of the invention; and FIGS. 8B and 8C are schematic frontal views of far-field light patterns projected by a light transmission device subject to the patterns of phase shifts listed in FIG. 8A, in accordance with further embodiments of the invention.

DETAILED DESCRIPTION OF EMBODIMENTS

Overview

Figure 1:
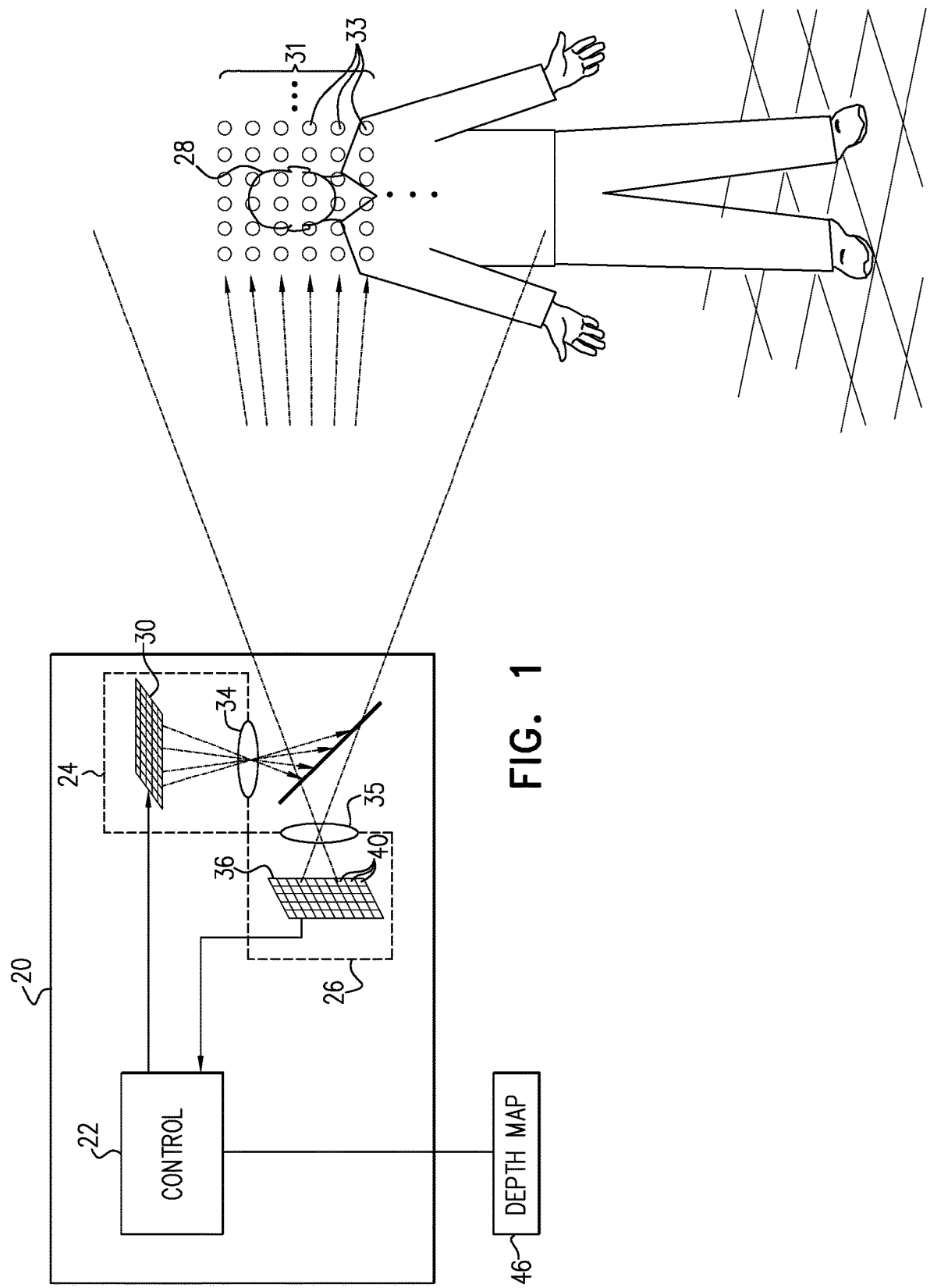
FIG. 1 is schematic side view of depth mapping apparatus, in accordance with an embodiment of the invention.

Many optical devices and applications depend on projection of patterned light, i.e., a far-field light pattern having a certain well-defined spatial distribution. Some of these applications also require that the spatial modulation of the pattern be controllable, meaning that the pattern can have variable shape and intensity characteristics. As one example, some LiDAR systems project an array of pulsed laser beams toward a target scene and create a depth map of the target scene by measuring the times of flight of the pulses reflected from each beam. Modulation of the spatial pattern of the pulsed laser beams, typically by scanning each beam over a certain range, can be used to increase the resolution and accuracy of the depth map.

Existing solutions for this purpose, however, tend to be bulky and heavy, since they must include hardware for both generating and scanning the beam pattern. The scanning is generally performed mechanically, for example by rotating a suitable mirror or array of mirrors. Consequently, scanning projection systems of this sort are difficult to integrate into wearable and portable devices.

Embodiments of the present invention that are described herein provide compact optical transmission devices that address these problems. The disclosed devices are advantageous in being able to project and modulate a far-field light pattern without using any moving optical or mechanical parts. The embodiments that are described below illustrate the usefulness of such devices in projecting a variable pattern of pulsed laser light spots for purposes of depth mapping. The techniques used in these embodiments, however, may be applied readily in projecting variable light patterns of other sorts, using either pulsed or continuous radiation.

In the disclosed embodiments, at least one light source injects a beam, or multiple beams, of coherent light into a waveguide, which comprises a transparent medium having mutually-parallel first and second surfaces arranged so that the light propagates within the waveguide by total internal reflection between these surfaces. (The terms "first" and "second" are used to distinguish between the two surfaces of the waveguide but not to impose a sequential order.) The waveguide may comprise a slab of the transparent medium, for example, or it may alternatively comprise multiple beam-guiding channels, each guiding a part of the propagating light.

An array of diffractive structures is applied to the waveguide, for example in the form of surface-relief phase structures (such as sub-wavelength ridges or pillars) in the first surface of the waveguide, or in the form of bulk holographic structures. Each such diffractive structure couples a fraction of the light propagating within the waveguide into a respective beam that exits the waveguide through the first surface. The array of diffractive structures thus generates, in the near field, a corresponding array of coherent beams, whose directions and beam characteristics are determined by the properties of the diffractive structures.

Interference between the beams that exit the waveguide forms a far-field light pattern, for example a pattern of spots, whose angular positions and intensities depend on the directions and phase relations between the beams. To control these phase relations, an array of tunable optical phase modulators is overlaid over the diffractive structures. These optical phase modulators are controlled to apply different respective phase shifts to the respective beams, and thus modulate the far-field light pattern. In the embodiments described below, the modulators comprise electro-optic modulators, such as liquid crystal cells, which create different phase delays depending on the voltage applied to each cell. Alternatively, other suitable types of optical phase modulators may be used.

The use of liquid crystal modulators is advantageous in being able to shift the phase over a wide range, and thus to change the far-field light pattern, in response to low applied voltages and without any moving parts. As shown in the figures and explained below in detail, the resulting device is able to shift and change the numbers of spots in the pattern, as well as changing respective intensities of the spots. Alternatively, the principles of the present invention may be applied in generating and modifying light patterns of other sorts.

Alternatively, tunable laser sources can be used in conjunction with static (non-tunable) phase modulator arrays in place of the tunable phase modulator arrays described above to modulate the far field light pattern. In this case, an array of static optical phase modulators can be overlaid over the diffractive phase structures.

Further alternatively, tunable laser sources can be used in conjunction with tunable optical phase modulators to complement the phase tuning.

System Description

FIG. 1 is a block diagram that schematically illustrates depth mapping apparatus 20, in accordance with an embodiment of the invention. Apparatus 20 comprises an illumination assembly 24 and a detection assembly 26, under control of a controller 22. Apparatus 20 is shown here as one possible application of the novel features of illumination assembly 24, which are described below. Alternatively, illumination assemblies of this sort may be used in other depth mapping scenarios, as well as in other applications of controllable beam patterns.

Illumination assembly 24 comprises an optical transmission device 30, which emits an array of beams of coherent light toward a target scene 28 (in this case containing a human subject). Device 30 comprises a light source, which injects at least one beam of coherent light into a waveguide, to which arrays of diffractive structures and optical phase modulators are applied as shown in the figures that follow. Typically, device 30 emits infrared radiation, but alternatively, radiation in other parts of the optical spectrum may be used. The beams can optionally be transmitted through beam-shaping optics 34. The beams interfere to form a corresponding far-field pattern 31 of spots 33 extending across the area of interest in scene 28. Beam-shaping optics 34 typically comprise one or more refractive elements, such as lenses, and may alternatively or additionally comprise one or more diffractive optical elements (DOES).

Controller 22 applies control signals to the optical phase modulators in transmission device 30 to tune the phase shifts applied by the optical phase modulators, as explained in detail hereinbelow. In addition, for purposes of depth mapping, controller 22 synchronizes the timing of pulses or amplitude variations of the beams that are output by device 30.

Detection assembly 26 receives the light that is reflected from target scene 28 (and specifically from spots 33) via objective optics 35. The objective optics form an image of the target scene on an array 36 of sensing elements 40, such as suitable photodiodes (which may be configured as single-photon detectors). Objective optics 35 form the image of target scene 28 on array 36 such that each spot 33 in pattern 31 on the target scene is imaged onto a set of one or more sensing elements 40, which may comprise a single sensing element or possibly a number of mutually-adjacent sensing elements. Illumination assembly 24 and detection assembly 26 are mutually aligned, and may be pre-calibrated, as well, so that controller 22 is able to identify the correspondence between spots 33 and sensing elements 40.

Controller 22 processes the signals output by the sensing elements in order to compute depth coordinates of the points in the target scene and thus outputs a depth map 46 of the scene. By application of appropriate control signals to the optical phase modulators in transmission device 30, controller 22 is able to shift spots 33 and/or change other features of pattern 31, so that detection assembly 26 receives reflections from additional points in scene 28. Additionally or alternatively, controller 22 may change the number, distribution, and/or intensities of spots 33. Apparatus 20 is thus able to generate depth maps 46 with enhanced resolution, accuracy, and signal/noise ratio.

Controller 22 typically comprises a general- or special-purpose microprocessor or digital signal processor, which is programmed in software or firmware to carry out the functions that are described herein. Alternatively or additionally, at least some of these functions of controller are carried out by digital logic circuits, which may be hard-wired or programmable. Controller 22 also includes suitable digital and analog peripheral circuits and interfaces for outputting control signals to and receiving inputs from the other elements of apparatus 20. The detailed design of such circuits will be apparent to those skilled in the art after reading the present description.

Figure 2A:
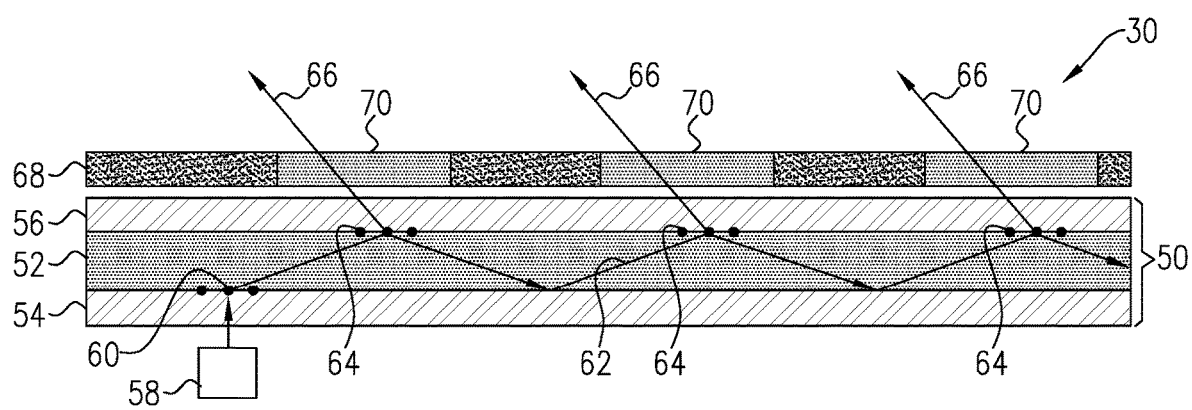
FIGS. 2A and 2B are schematic sectional and top views, respectively, of an optical transmission device, in accordance with an embodiment of the invention.
Figure 2B:
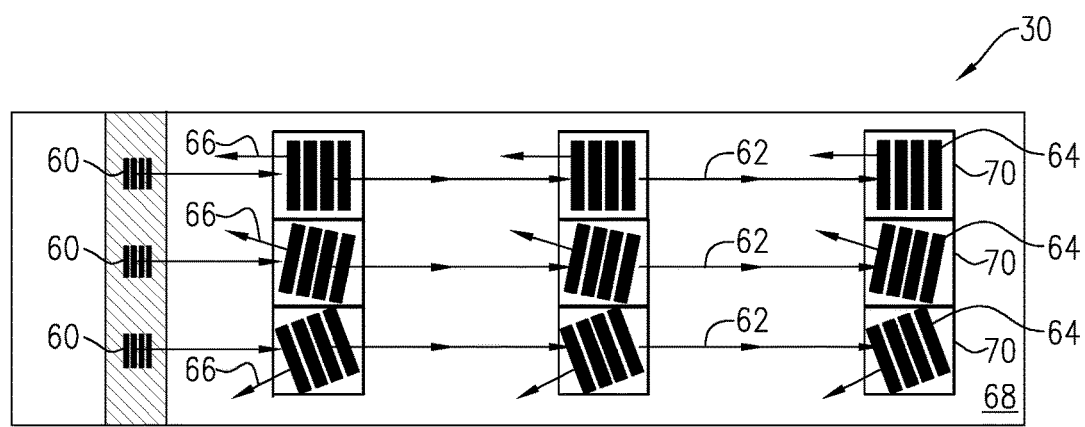

Reference is now made to FIGS. 2A and 2B, which are schematic sectional and top views, respectively, of optical transmission device 30, in accordance with an embodiment of the invention. Device 30 comprises a waveguide 50, comprising a slab of a transparent medium 52, such as a suitable glass or polymer. The mutually-parallel lower and upper surfaces of medium are covered in this embodiment by a lower cladding 54 and an upper cladding 56 of a transparent medium with a lower refractive index than that of medium 52, so that light propagates within waveguide 50 by total internal reflection (TIR) between the upper and lower surfaces. Alternatively, the upper and lower surfaces of medium 52 may be covered with layers of graded refractive index, or they may be uncladded.

A light source 58 injects at least one beam of coherent light into waveguide 50. Light source 58 may comprise, for example, an edge-emitting laser diode or a vertical-cavity surface-emitting laser (VCSEL) or any other suitable coherent source. A diffractive structure 60, such as a surface-relief grating, couples the beam that is output from light source 58 through the lower surface of medium 52 into waveguide 50, forming one or more beams 62 of light that propagate through the waveguide by TIR. Alternatively, the light may be coupled into the waveguide through a diffractive structure in the upper surface of medium 52, or directly in through the edge of medium 52, or by any other suitable technique that is known in the art.

Although only a single light source is shown in FIG. 2A, an array of several light sources may be used to inject respective beams into a matching array of waveguides 50, for example via respective diffractive structures 60 as shown in FIG. 2B. To reduce the angular spread of beams 62 within waveguide 50, it is desirable that the beam or beams that are input to the waveguide from light source 58 be collimated.

Figure 3:
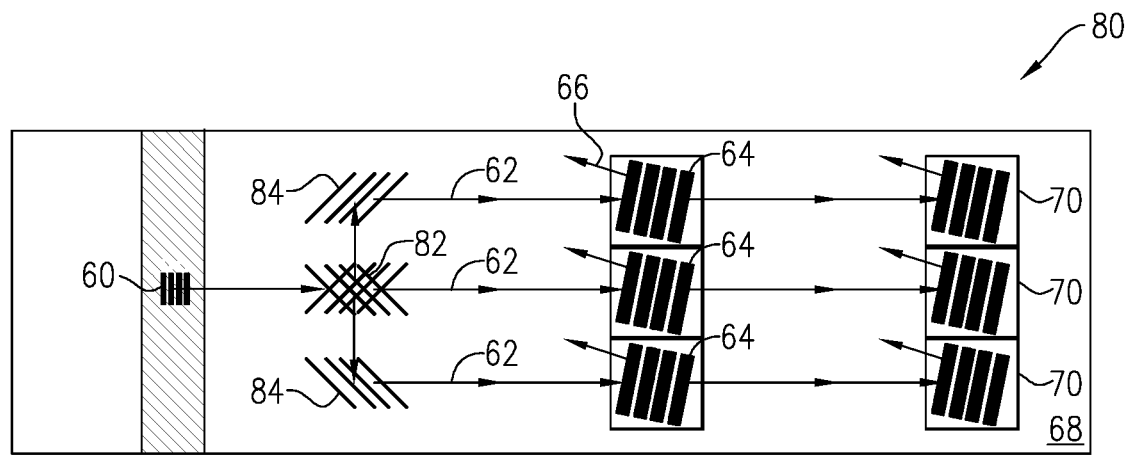
FIG. 3 is a schematic top view of an optical transmission device, in accordance with another embodiment of the invention.

An array of diffractive structures 64 is applied to medium 52 to couple respective beams 66 of the coherent light out through cladding 56 on the upper surface of the waveguide. Each beam 66 contains a certain fraction of the energy of beam 62 that is propagating through the waveguide. Diffractive structures 64 in the pictured embodiment comprise diffraction gratings having the form of surface-relief phase structures, with dimensions smaller than the wavelength of beam 62. In the embodiment shown in FIG. 6B, diffractive structures 64 are oriented so as to direct beams 66 in a number of different directions. Alternatively, the diffractive structures may be oriented to direct all the beams in the same direction, as shown in FIG. 3, for example. In alternative embodiments, other types of diffractive structures, such as volume holographic structures, may be used for these purposes. Further alternatively or additionally, these or other sorts of diffractive structures may be configured to couple light reflected from target scene 28 back into waveguide 50 for purposes of sensing, instead of or in addition to the separate detection assembly 26 that is shown in FIG. 1.

A modulator layer 68, comprising an array of tunable optical phase modulators 70, is overlaid on waveguide 50. Each modulator 70 is aligned with a respective diffractive structure 64 and thus applies a certain phase shift to the corresponding beam 66. In the present embodiment, modulators 70 comprise electro-optical elements, for example liquid crystal cells. Controller 22 applies different voltages to the liquid crystal cells via respective electrodes (not shown in the figures), using circuits and methods that are known in the art, thereby causing modulators 70 to apply different, respective phase shifts to the respective beams. The choice of phase shifts modifies the far-field light pattern formed by interference between beams 66, as is illustrated in the figures that follow.

Alternatively, other types of tunable phase modulators may be used. For example, resistive heating coils may be deposited over or embedded in waveguide 50 in order to change the local temperature of the waveguide or the phase modulator material, and thus introduce local changes in the refractive index. As another example, the wavelength of light source 58 may be modulated, thus changing the phase relations between beams 66 exiting the waveguide. All such phase modulation schemes are considered to be within the scope of the present invention.

In the pictured embodiment, diffractive structures 64 and modulators 70 are arranged in rectilinear two-dimensional arrays. Diffractive structures 60 couple the beams from respective light sources into waveguide 50 so that the beams propagate within the slab of transparent medium 52 along respective beam paths that are aligned to impinge on different respective groups of diffractive structures 64 for output from the waveguide. Alternatively, the arrays of diffractive structures and modulators may be arranged in other sorts of two-dimensional patterns, as well as in one-dimensional arrays, depending on application requirements.

FIG. 3 is a schematic top view of a light transmission device 80, in accordance with another embodiment of the invention. Device 80 is similar in structure to device 30 except that it includes only a single diffractive structure 60 for injection of the laser beam into waveguide 50. In order to distribute the light to all of diffractive structures 64 for output, waveguide 50 contains a beam-splitting structure 82, which divides the injected beam into multiple beams 62 within the waveguide. Beam-turning structures 84 deflect the divided beams so that they propagate within the slab of medium 52 along respective beam paths that are aligned to impinge on different respective groups of diffractive structures 64. (In this embodiment, by way of example, all of diffractive structures 64 direct respective beams 66 out of the waveguide in the same direction.) Beam-splitting structure 82 and beam-turning structures 84 may comprise diffractive components, for example, such as surface-relief phase structures. Alternatively, at least some of these structures may comprise reflective surfaces.

Figure 4:
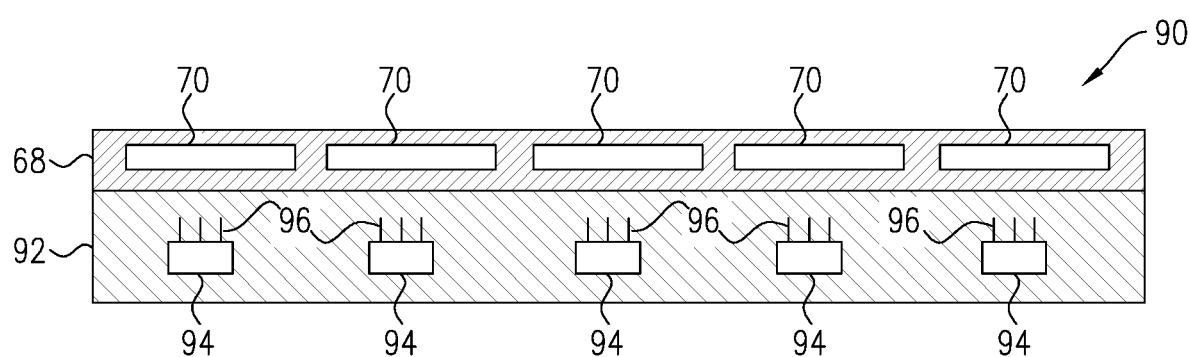
FIG. 4 is a schematic sectional view of an optical transmission device, in accordance with an alternative embodiment of the invention.

FIG. 4 is a schematic sectional view of a light transmission device 90, in accordance with an alternative embodiment of the invention. In this embodiment, a waveguide 92 contains multiple beam-guiding channels 94 side by side between the upper and lower surfaces. Channels 94 have a higher index of refraction than the surrounding material in waveguide 92 and thus support multimode light propagation by TIR within the channels. Diffractive structures 96 are applied to beam-guiding channels 94 in order to couple the light out of the channels and through respective optical phase modulators 70, as in the preceding embodiments. The use of multiple beam-guiding channels 94 in place of the slab waveguide of the preceding embodiments is helpful in relaxing the required degree of collimation of the input laser beam or beams.

Methods of Pattern Projection

Figure 5A:
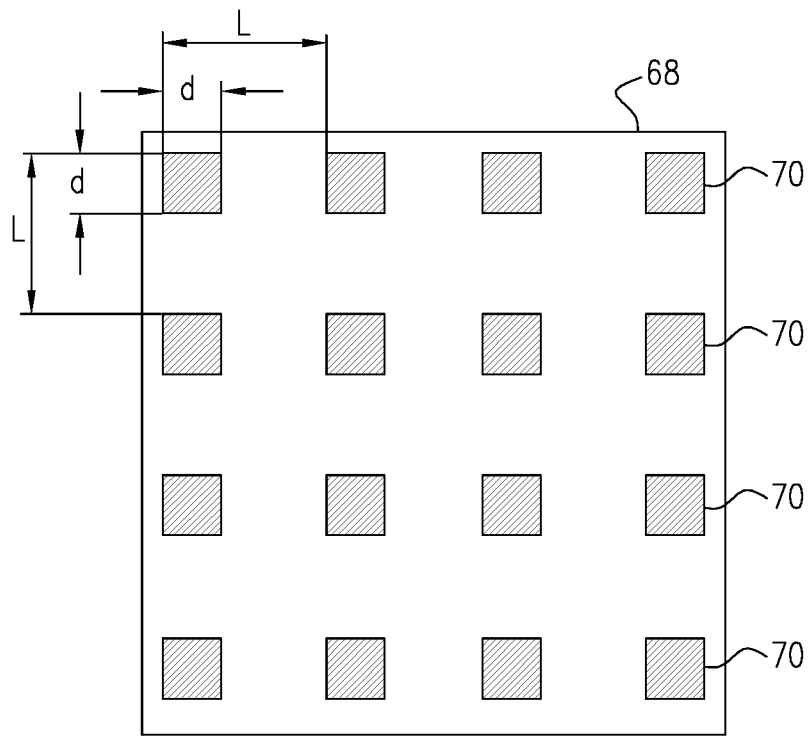
FIG. 5A is a schematic top view of an array of phase modulators used in an optical transmission device, in accordance with an embodiment of the invention.

FIG. 5A is a schematic top view of an array of phase modulators 70 used in a light transmission device, such as the devices shown in the preceding figures, in accordance with an embodiment of the invention. Modulators 70, comprising liquid crystal cells, for example, define respective apertures of width d and are arrayed across modulator layer 68 with a pitch L. (For convenience, the vertical and horizontal dimensions of the apertures in the pictured array are taken to be the same, although different aperture shapes and distributions are also possible.) The fill factor of the array of modulator apertures is defined as $\eta = d/L$.

Optical phased arrays that are known in the art are generally designed to maximize the fill factor, with typical values of $\eta = 0.8$, so that most of the far-field optical energy projected by the array is concentrated in a single beam. By contrast, in embodiments of the present invention, the fill factor of modulators is intentionally small, for example $\eta < 0.2$, so that the far-field optical energy forms an array of beams, rather than a single beam.

Figure 5B:
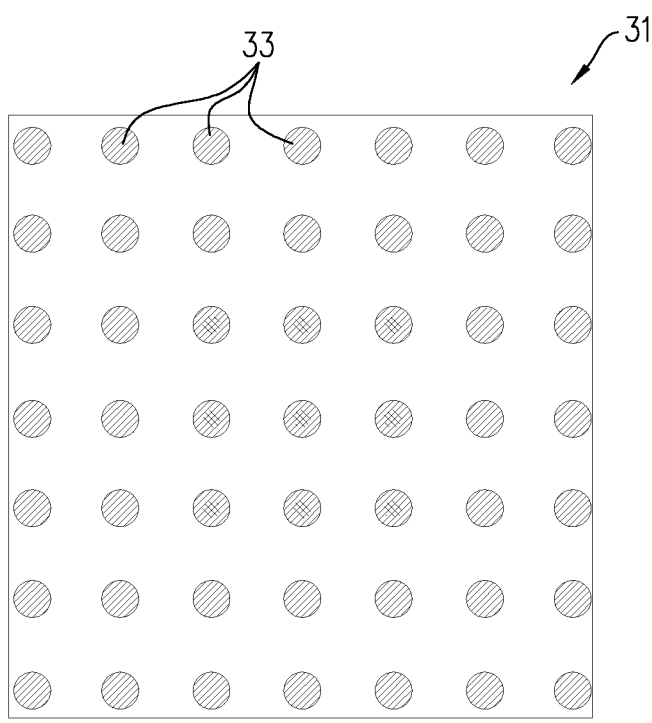
FIG. 5B is a schematic frontal view of a far-field light pattern projected by the device of FIG. 5A, in accordance with an embodiment of the invention.

FIG. 5B is a schematic frontal view of far-field light pattern 31 projected by an optical transmission device using the array of phase modulators 70 that is shown in FIG. 5A, in accordance with an embodiment of the invention. Pattern 31 comprises an array of spots 33 corresponding to the array of beams generated by the device. Generally speaking, the smaller the fill factor $\eta$, the larger will be the number of spots 33 in the array. Controller 22 (FIG. 1) is able to shift the locations and modulate the intensities of the spots by tuning the respective phase shifts that are applied to phase modulators 70. Some examples are shown in the figures that follow. Alternative light patterns and implementations will be apparent to those skilled in the art after reading the present description.

FIG. 6A is a table listing patterns of phase shifts applied by an array of phase modulators 70, in accordance with an embodiment of the invention. The phase shifts are applied, as explained above, by applying different voltages to the liquid crystal cells (or other appropriate control signals if optical phase modulators of other types are used). In this embodiment and in the embodiments that follow, the array of phase modulators is assumed to be a 4×4 array as shown in FIG. 5A. The phase modulators in the array are identified in the top row of the table by their row and column numbers in the array. The phase shifts applied by the phase modulators are relative to a zero-reference phase corresponding to the case in which all the beams emerging from the modulator array are in phase, i.e., the optical path difference between the beams is equal to an integer number of waves emitted by the light source.

Each row of the table in FIG. 6A lists a different set of respective phase shifts that are applied to phase modulators 70. The first row is the default configuration, which gives rise to pattern 31 that is shown in FIG. 5B. The relative phases in each successive row in the table will shift the locations of spots 33 in pattern 31 successively farther to the right. Intermediate values of the phase shifts between the values shown in the table can be used to scan spots 33 continuously if desired. Additionally or alternatively, the relative phases may be varied over the columns of modulators 70 in order to shift the locations of spots 33 up and down.

FIG. 6B is a schematic frontal view of the far-field light pattern 31 projected by the device of FIG. 5A subject to the phase shifts listed in the third row of the table in FIG. 6A, in accordance with an embodiment of the invention. By application of antipodal phase shifts to successive columns of the array of phase modulators 70, spots 33 are shifted horizontally by a distance equal to half the spacing between the spots.

Figure 7B:
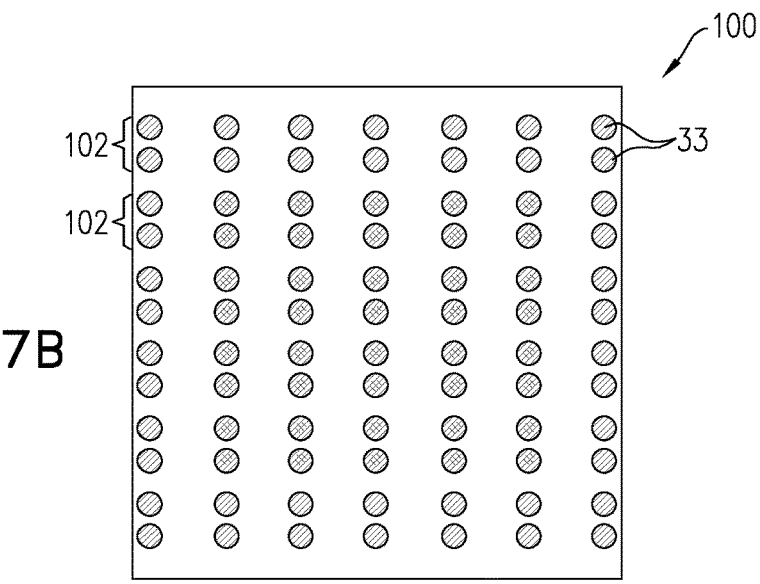
FIGS. 7B, 7C, and 7D are schematic frontal views of far-field light patterns projected by a light transmission device subject to the patterns of phase shifts listed in FIG. 7A, in accordance with embodiments of the invention.
Figure 7C:
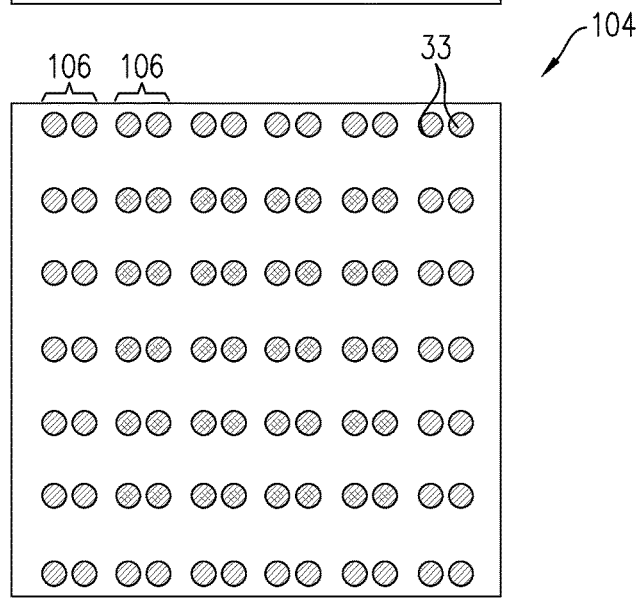
Figure 7D:
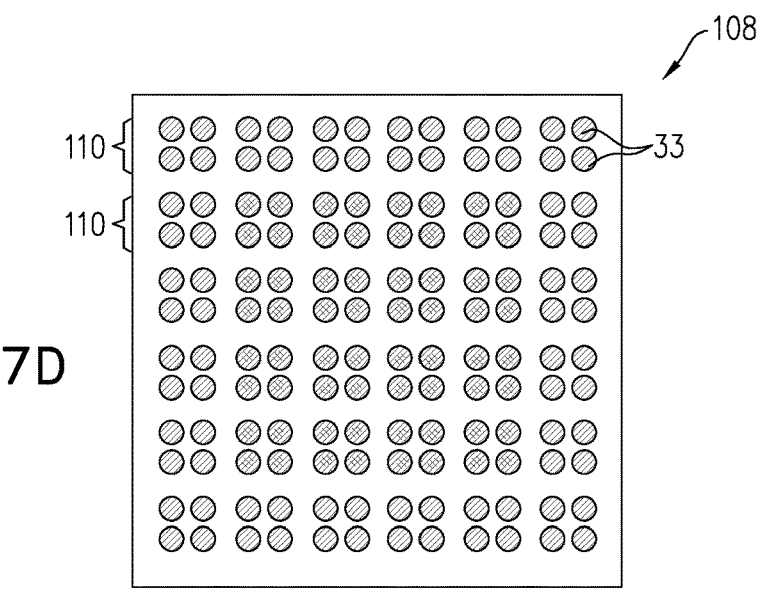

Reference is now made to FIGS. 7A-7D, which schematically illustrate the effects of different relative phase shifts that are applied by a 4×4 array of phase modulators 70, in accordance with an embodiment of the invention. FIG. 7A is a table listing patterns of phase shifts applied by the phase modulators, while FIGS. 7B, 7C, and 7D are frontal views of respective far-field patterns 100, 104, and 108 of spots 33 that are obtained by application of these phase shifts. The rows in the table of FIG. 7A corresponds respectively to the patterns shown in FIGS. 7B, 7C, and 7D. This embodiment illustrates how tuning of the relative phase shifts applied by phase modulators 70 can be used to change the shapes of spots 33 in the projected pattern as well as the respective intensities of the spots.

The choices of different phase shifts shown in the table of FIG. 7A modify the intensity distributions of the beams in patterns 100, 104, and 108. Thus, in pattern 100, the circular spots 33 shown in FIG. 5B are transformed into vertical pairs 102 of spots, whereas in pattern 104, spots 33 are transformed into horizontal pairs 106 of spots. In the case of pattern 108, the circular spots are form quartets 110 of spots. These different choices of phase shifts can be used to vary the local density of patterns that are projected and, in this manner, to adjust the resolution of a depth map, for example.

Reference is now made to FIGS. 8A-8C, which schematically illustrate the effects of different relative phase shifts that are applied by a 4×4 array of phase modulators 70, in accordance with a further embodiment of the invention. FIG. 8A is a table listing patterns of phase shifts applied by the phase modulators, while FIGS. 8B and 8C are frontal views of far-field patterns 120 of spots 33 that are obtained by application of these phase shifts.

The relative phases of the phase modulators in this case cause patterns 120 to have the form of a checkerboard. Changing the phases as shown in the table reverses the bright and dark areas of the pattern, as shown by the alternation in the positions of the spots in FIG. 8C relative to FIG. 8B. When homogeneous illumination is required, the different phases can be alternated rapidly, thus filling the entire field of illumination. (This principle of rapid alternation, possibly with randomization of the phases, can be applied in the other embodiments described above, as well.)

Although the embodiments described above relate specifically to depth mapping applications, the principles of the present invention may similarly be applied in other applications requiring patterned illumination. For example, the sorts of patterns described above may be used in spatial encoding of transmitted information. Multiple different wavelengths may be used, as described above, in order to increase the versatility of pattern generation still further.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical transmission device, comprising:
   a waveguide comprising a transparent medium having mutually-parallel first and second surfaces arranged so that light propagates within the waveguide by internal reflection between the first and second surfaces;
   at least one light source, which is configured to inject coherent light into the waveguide;
   a first array of diffractive structures applied to the waveguide and configured to couple respective beams of the coherent light out through the first surface of the waveguide; and
   a second array of tunable optical phase modulators, which are overlaid on respective ones of the diffractive structures in the first array and are configured to apply different respective phase shifts to the respective beams, thereby modulating a far-field light pattern formed by interference between the beams.

2. The device according to claim 1, wherein the first and second arrays are two-dimensional arrays.

3. The device according to claim 2, wherein the waveguide comprises a slab of the transparent medium.

4. The device according to claim 3, wherein the at least one light source is configured to inject multiple beams of the coherent light into the slab so that the beams propagate within the slab along respective beam paths that are aligned to impinge on different respective groups of the diffractive structures in the first array.

5. The device according to claim 3, and comprising a beam-splitting structure, which is configured to divide the coherent light injected by the at least one light source into multiple beams, which propagate within the slab along respective beam paths that are aligned to impinge on different respective groups of the diffractive structures in the first array.

6. The device according to claim 2, wherein the waveguide comprises multiple beam-guiding channels between the first and second surfaces, and wherein the diffractive structures are applied to the beam-guiding channels.

7. The device according to claim 1, and comprising a further diffractive structure applied to the waveguide to couple the coherent light from the at least one light source through one of the first and second surfaces into the waveguide.

8. The device according to claim 1, wherein the diffractive structures comprise surface-relief phase structures having dimensions smaller than a wavelength of the coherent light.

9. The device according to claim 1, wherein the tunable optical phase modulators comprise electro-optical modulators.

10. The device according to claim 9, wherein the electro-optical modulators comprise liquid crystal cells.

11. The device according to claim 1, wherein the second array extends over an area of the first surface of the transparent medium, and the tunable optical phase modulators cover a part of the area with a fill factor that is less than 20%.

12. The device according to claim 1, and comprising a controller coupled to apply control signals to the optical phase modulators to tune the respective phase shifts applied by the optical phase modulators to the respective beams.

13. The device according to claim 12, wherein the far-field light pattern comprises a third array of spots, and wherein the controller is configured to tune the respective phase shifts to shift the spots.

14. The device according to claim 12, wherein the far-field light pattern comprises a third array of spots, and wherein the controller is configured to tune the respective phase shifts to change a number of the spots in the third array.

15. The device according to claim 12, wherein the far-field light pattern comprises a third array of spots, and wherein the controller is configured to tune the respective phase shifts to change respective intensities of the spots.

16. A method for optical transmission, comprising:
   providing a waveguide comprising a transparent medium having mutually-parallel first and second surfaces arranged so that light propagates within the waveguide by internal reflection between the first and second surfaces;
   injecting coherent light into the waveguide;
   applying a first array of diffractive structures to the waveguide to couple respective beams of the coherent light out through the first surface of the waveguide; and applying, by a second array of tunable optical phase modulators, which are overlaid on respective ones of the diffractive structures in the first array, different respective phase shifts to the respective beams, thereby modulating a far-field light pattern formed by interference between the beams.

17. The method according to claim 16, wherein injecting the coherent light comprises applying a further diffractive structure to the waveguide to couple the coherent light from a light source through one of the first and second surfaces into the waveguide.

18. The method according to claim 16, wherein the diffractive structures comprise surface-relief phase structures having dimensions smaller than a wavelength of the coherent light.

19. The method according to claim 16, wherein the tunable optical phase modulators comprise electro-optical modulators.

20. The method according to claim 16, wherein applying the different respective phase shifts comprises applying control signals to the optical phase modulators to tune the respective phase shifts applied by the optical phase modulators to the respective beams.

* * * * *